(12) United States Patent
Green

(10) Patent No.: US 9,248,736 B2
(45) Date of Patent: Feb. 2, 2016

(54) MODIFICATION OF AN INDUSTRIAL VEHICLE TO INCLUDE A CONTAINMENT AREA AND MOUNTING ASSEMBLY FOR AN ALTERNATE FUEL

(75) Inventor: Jason Green, Davie, FL (US)

(73) Assignee: Gaseous Fuel Systems, Corp., Weston, FL (US)

( * ) Notice: Subject to any disclaimer, the term of this patent is extended or adjusted under 35 U.S.C. 154(b) by 109 days.

(21) Appl. No.: 13/234,995

(22) Filed: Sep. 16, 2011

(65) Prior Publication Data
US 2013/0068905 A1   Mar. 21, 2013

(51) Int. Cl.
*B60K 15/067* (2006.01)
*B60K 15/063* (2006.01)
*B60K 15/07* (2006.01)
*B66F 9/07* (2006.01)
*F02M 37/00* (2006.01)
*B60P 1/00* (2006.01)

(52) U.S. Cl.
CPC ............ *B60K 15/063* (2013.01); *B60K 15/067* (2013.01); *B60K 15/07* (2013.01); *B60P 1/00* (2013.01); *B66F 9/07* (2013.01); *F02M 37/00* (2013.01); *B60K 2015/0637* (2013.01); *B60Y 2200/142* (2013.01)

(58) Field of Classification Search
CPC .... B60K 15/063; B60K 15/067; B60K 15/07; B60K 2015/0637; B66F 9/07; F02M 37/00; B60P 1/00
USPC .................. 248/133, 220.21, 346.01, 346.03, 248/346.06; 280/830, 834; 220/562, 563; 123/575; 180/69.5, 314
See application file for complete search history.

(56) References Cited

U.S. PATENT DOCUMENTS

| | | | |
|---|---|---|---|
| 3,866,781 A * | 2/1975 | Stedman et al. | ............... 414/715 |
| 4,006,852 A | 2/1977 | Pilsner et al. | |
| 4,078,629 A | 3/1978 | Kutay et al. | |

(Continued)

FOREIGN PATENT DOCUMENTS

| | | |
|---|---|---|
| CA | 2741263 | 10/2014 |
| WO | WO 02101214 | 12/2002 |

(Continued)

OTHER PUBLICATIONS

Caterpillar 785C Mining Truck Spec Sheet, 2010.*

(Continued)

*Primary Examiner* — Terrell McKinnon
*Assistant Examiner* — Eret McNichols
(74) *Attorney, Agent, or Firm* — Malloy & Malloy, P.L.

(57) ABSTRACT

A system and attendant structural components for incorporating an alternate fuel supply, such as of the type used in combination with a conventional distillate fuel, to power a heavy duty industrial vehicle, such as a mine haul dump truck. The system and attendant structure includes a mounting assembly structured for containment and support of the alternate fuel and a containment area disposed on the vehicle and structured and dimensioned to retain the mounting assembly therein. The containment area and the mounting assembly are disposed in laterally adjacent, exposed relation to an operator area of the mine haul truck, wherein the mounting assembly and the containment area are cooperatively disposed and structured to facilitate storage of the alternate fuel and operative communication and distribution thereof with the powering engine of the mine haul vehicle.

11 Claims, 7 Drawing Sheets

(56) References Cited

U.S. PATENT DOCUMENTS

| | | | |
|---|---|---|---|
| 4,234,922 A | 11/1980 | Wilde et al. | |
| 4,288,086 A * | 9/1981 | Oban et al. | 280/834 |
| 4,335,697 A | 6/1982 | McLean | |
| 4,415,051 A * | 11/1983 | Taylor | 180/65.1 |
| 4,442,665 A | 4/1984 | Fick et al. | |
| 4,489,699 A | 12/1984 | Poehlman | |
| 4,499,885 A | 2/1985 | Weissenbach et al. | |
| 4,522,159 A | 6/1985 | Engel et al. | |
| 4,527,516 A | 7/1985 | Foster | |
| 4,535,728 A | 8/1985 | Batchelor | |
| 4,603,674 A | 8/1986 | Tanaka | |
| 4,606,322 A | 8/1986 | Reid et al. | |
| 4,617,904 A | 10/1986 | Pagdin | |
| 4,641,625 A | 2/1987 | Smith | |
| 4,708,094 A | 11/1987 | Helmich et al. | |
| 4,770,428 A * | 9/1988 | Sugiyama | 280/834 |
| 4,799,565 A | 1/1989 | Handa et al. | |
| 4,817,568 A | 4/1989 | Bedford | |
| 4,861,096 A * | 8/1989 | Hastings | 296/183.1 |
| 4,955,326 A | 9/1990 | Helmich | |
| 5,033,567 A * | 7/1991 | Washburn et al. | 180/89.12 |
| 5,050,550 A | 9/1991 | Gao | |
| 5,054,799 A | 10/1991 | Fingerie | |
| 5,081,969 A | 1/1992 | Long, III | |
| 5,092,305 A | 3/1992 | King | |
| 5,156,230 A * | 10/1992 | Washburn | 180/170 |
| 5,215,157 A | 6/1993 | Teich | |
| 5,224,457 A | 7/1993 | Arsenault et al. | |
| 5,355,854 A | 10/1994 | Aubee | |
| 5,370,097 A | 12/1994 | Davis | |
| 5,375,582 A | 12/1994 | Wimer | |
| 5,379,740 A | 1/1995 | Moore et al. | |
| 5,518,272 A | 5/1996 | Fukagawa et al. | |
| 5,526,786 A | 6/1996 | Beck et al. | |
| 5,546,908 A | 8/1996 | Stokes | |
| 5,566,653 A | 10/1996 | Feuling | |
| 5,566,712 A | 10/1996 | White et al. | |
| 5,593,167 A * | 1/1997 | Barnhardt et al. | 280/164.1 |
| 5,598,825 A | 2/1997 | Neumann | |
| 5,609,037 A | 3/1997 | Fischler | |
| 5,701,928 A | 12/1997 | Aoki | |
| 5,735,253 A | 4/1998 | Perotto et al. | |
| 5,755,210 A | 5/1998 | Sato et al. | |
| 5,794,979 A | 8/1998 | Kasuga et al. | |
| 5,806,490 A | 9/1998 | Nogi et al. | |
| 5,810,309 A | 9/1998 | Augustine et al. | |
| 5,845,940 A | 12/1998 | Colburn | |
| 5,937,800 A | 8/1999 | Brown et al. | |
| 5,996,207 A | 12/1999 | Brown et al. | |
| 6,003,478 A | 12/1999 | Huber | |
| 6,041,762 A | 3/2000 | Sirosh et al. | |
| 6,101,986 A | 8/2000 | Brown et al. | |
| 6,151,547 A | 11/2000 | Kumar et al. | |
| 6,168,229 B1 * | 1/2001 | Kooi et al. | 296/190.07 |
| 6,250,260 B1 | 6/2001 | Green | |
| 6,250,723 B1 | 6/2001 | Barberis et al. | |
| 6,289,881 B1 | 9/2001 | Klopp | |
| 6,513,485 B2 | 2/2003 | Ogawa et al. | |
| 6,543,395 B2 | 4/2003 | Green | |
| 6,550,811 B1 | 4/2003 | Bennett et al. | |
| 6,676,163 B2 | 1/2004 | Joitescu et al. | |
| 6,718,952 B2 | 4/2004 | Finch | |
| 6,751,835 B2 * | 6/2004 | Fenton | 29/401.1 |
| 6,863,034 B2 | 3/2005 | Kern et al. | |
| 6,875,258 B2 * | 4/2005 | Kuperus | 96/147 |
| 6,938,928 B2 | 9/2005 | Pfohl et al. | |
| 7,019,626 B1 | 3/2006 | Funk | |
| 7,019,826 B2 | 3/2006 | Vook et al. | |
| 7,270,209 B2 | 9/2007 | Suess | |
| 7,299,122 B2 | 11/2007 | Perkins | |
| 7,334,818 B2 | 2/2008 | Mascarenhas et al. | |
| 7,341,164 B2 | 3/2008 | Barquist et al. | |
| 7,410,152 B2 | 8/2008 | Yates | |
| 7,444,986 B2 | 11/2008 | Shute | |
| 7,607,630 B2 | 10/2009 | Jung et al. | |
| 7,775,311 B1 | 8/2010 | Hardy et al. | |
| 7,874,451 B2 | 1/2011 | Bel | |
| 7,976,067 B2 | 7/2011 | Naganuma et al. | |
| 8,005,603 B2 | 8/2011 | Fisher et al. | |
| 8,282,132 B2 * | 10/2012 | Griesbaum | 280/834 |
| 8,498,799 B2 | 7/2013 | Matthews, Jr. et al. | |
| 8,534,403 B2 | 9/2013 | Pursifull | |
| 8,550,274 B2 | 10/2013 | Gerding | |
| 8,556,107 B2 | 10/2013 | McRobbie et al. | |
| 8,820,289 B2 | 9/2014 | Green | |
| 8,881,933 B2 | 11/2014 | Green | |
| 8,882,071 B2 | 11/2014 | Green | |
| 9,031,763 B2 | 5/2015 | Green | |
| 2001/0037549 A1 * | 11/2001 | Fenton | 29/401.1 |
| 2002/0017088 A1 | 2/2002 | Dillon | |
| 2002/0029770 A1 | 3/2002 | Heffel et al. | |
| 2002/0030397 A1 * | 3/2002 | Tamura et al. | 298/17 R |
| 2002/0078918 A1 | 6/2002 | Ancimer et al. | |
| 2003/0178422 A1 * | 9/2003 | Kosuge et al. | 220/4.14 |
| 2003/0187565 A1 | 10/2003 | Wong | |
| 2004/0011050 A1 | 1/2004 | Inoue | |
| 2004/0140412 A1 | 7/2004 | Hendzel et al. | |
| 2004/0148086 A1 | 7/2004 | Tafazoli et al. | |
| 2005/0121005 A1 | 6/2005 | Edwards | |
| 2005/0230579 A1 * | 10/2005 | Mascarenhas et al. | 248/218.4 |
| 2006/0033322 A1 | 2/2006 | Suess | |
| 2008/0023957 A1 | 1/2008 | Diehl | |
| 2008/0042028 A1 * | 2/2008 | Ross | B60K 15/07 248/230.1 |
| 2009/0152043 A1 | 6/2009 | Lee | |
| 2009/0320786 A1 | 12/2009 | Fisher | |
| 2010/0045017 A1 * | 2/2010 | Rea | 280/830 |
| 2010/0051567 A1 * | 3/2010 | Ross, Jr. | B60K 15/07 211/85.18 |
| 2010/0078244 A1 * | 4/2010 | Pursifull | 180/69.5 |
| 2010/0127002 A1 | 5/2010 | Bel | |
| 2011/0202256 A1 | 8/2011 | Sauve et al. | |
| 2012/0001743 A1 * | 1/2012 | Cotten et al. | 340/438 |
| 2012/0060800 A1 | 3/2012 | Green | |
| 2012/0067660 A1 * | 3/2012 | Kashu et al. | 180/296 |
| 2012/0112533 A1 | 5/2012 | Yarmak et al. | |
| 2012/0310509 A1 | 12/2012 | Pardo et al. | |
| 2012/0325355 A1 * | 12/2012 | Docheff | 137/899 |
| 2013/0068905 A1 | 3/2013 | Green | |
| 2013/0069357 A1 | 3/2013 | Green | |
| 2013/0074816 A1 | 3/2013 | Green | |
| 2013/0092694 A1 | 4/2013 | Green | |
| 2013/0112768 A1 | 5/2013 | Hagenbuch | |
| 2013/0245864 A1 * | 9/2013 | Frazier et al. | 701/19 |
| 2014/0053800 A1 | 2/2014 | Steffen et al. | |
| 2014/0060946 A1 * | 3/2014 | Willi | B60K 15/07 180/69.4 |
| 2014/0196687 A1 | 7/2014 | Coldren et al. | |
| 2015/0000643 A1 | 1/2015 | Green | |
| 2015/0020770 A1 | 1/2015 | Green | |
| 2015/0025774 A1 | 1/2015 | Green | |

FOREIGN PATENT DOCUMENTS

| | | |
|---|---|---|
| WO | WO 2008/037175 A1 | 4/2008 |
| WO | WO 2012/036768 A1 | 3/2012 |
| WO | WO 2013/039708 A1 | 3/2013 |
| WO | WO 2013/048812 A1 | 4/2013 |
| WO | WO 2013/058988 A2 | 4/2013 |

OTHER PUBLICATIONS

GFS Corp., 'First LNG Mining Truck in U.S.' [online press release]. Oct. 21, 2010. Retrieved from the internet on Oct. 25, 2012: http://www.d2ginc.com/PDF/First%20LNG%20Mining%20Truck%20in%20US%20Press%20Kit%20Oct%2021.pdf.

* cited by examiner

MODIFICATION OF AN INDUSTRIAL VEHICLE TO INCLUDE A CONTAINMENT AREA AND MOUNTING ASSEMBLY FOR AN ALTERNATE FUEL

BACKGROUND OF THE INVENTION

1. Field of the Invention

This invention relates to a system, including cooperative structure, which facilitates the efficient disposition of a mounting assembly, structured for containment and support of an alternate or auxiliary fuel supply, on a heavy duty industrial vehicle, such as a mine haul dump truck. The mounting assembly is mounted on and/or within a containment area disposed on the vehicle and dimensioned and configured to retain the mounting assembly in laterally adjacent, exposed relation to an operator area of the vehicle. As such, the mounting assembly and the containment area are cooperatively disposed and structured to facilitate storage of and operative communication of the alternate fuel with the powering engine of the vehicle.

2. Description of the Related Art

Mine haul trucks are off-highway, two axle, rigid dump trucks, specifically engineered for use in high production mining and heavy duty construction environments. As such, haul truck capacities typically range from 50 short tons (45 tons) to 400 short tons (363 tons). In addition, the largest and highest payload capacity of such mine haul trucks is referred to as "ultra class" trucks. This ultra class includes haul trucks having a payload capacity of at least 300 short tons or greater. Numerous manufacturers throughout the world produce such mammoth vehicles which are engineered for both performance and long operable life. Trucks of this type are developed specifically for high production duty wherein material is transported in large quantities in order to lower transportation costs on a cost-per-ton basis.

Typically mine haul trucks are powered by either direct drive diesel or diesel electric power trains frequently including a multiple horse power turbo charged diesel engine. Due to the exceptional size and weight of such vehicles, they cannot be driven on public access roads, but are ideal for high production environments wherein massive quantities of material must be moved, handled, relocated, etc. on a continuous or regular basis.

Accordingly, it is well recognized that distillate fuels, specifically diesel, are used as the primary fuel source for such vehicles. Attempts to maximize the operational efficiency, while maintaining reasonable safety standards, have previously involved modified throttle control facilities. These attempts serve to diminish adverse effects of control mechanisms which may be potentially harmful to the vehicle engine operation as well as being uneconomical. Typical adverse effects include increased fuel consumption and wear on operative components. Therefore, many diesel engines and the vehicles powered thereby are expected to accommodate various types of high capacity payloads and provide maximum power for relatively significant periods of operation. As a result, many diesel engines associated with heavy duty and off-road vehicles are commonly operated at maximum or near maximum capacity resulting in an attempted maximum power delivery from the vehicle engine and consequent high rates of diesel consumption. It is generally recognized that the provision of a substantially rich fuel mixture in the cylinders of a diesel engine is necessary for providing maximum power when required. Such continued high capacity operation of the vehicle engine results not only in wear on the engine components but also in high fuel consumption rates, lower operating efficiencies, more frequent oil changes and higher costs of operation.

Accordingly, there is a long recognized need for a fuel control system specifically intended for use with high capacity, off-road vehicles including mine haul vehicles of the type generally described above that would allow the use of more efficient fueling methods using other commonly available fuel sources. Therefore, an improved fuel control system is proposed which is determinative of an effective and efficient operative fuel mixture comprised of a combination of gaseous and distillate fuels. More specifically, gaseous fuel can comprise natural gas or other appropriate gaseous type fuels, wherein distillate fuel would typically include diesel fuel.

Such a preferred and proposed fuel control system should be capable of regulating the composition of the operative fuel mixture on which the vehicle engine currently operates to include 100% distillate fuel, when the vehicle's operating mode(s) clearly indicate that the combination of gaseous and distillate fuels is not advantageous. Further, such a proposed fuel control system could have an included secondary function to act as a general safety system serving to monitor critical engine fuel system and chassis parameters. As a result, control facilities associated with such a preferred fuel control system should allow for discrete, user defined control and safety set points for various engine, fuel system and chassis parameters with pre-alarm, alarm and fault modes.

In addition, the operation of such a fuel control system would be facilitated by the inclusion of a preferred mounting assembly for the alternate fuel supply. As such, the included and preferred mounting assembly would be readily adaptive for use on different vehicles while facilitating the secure, safe and efficient distribution of the alternate fuel in the intended manner.

SUMMARY OF THE INVENTION

This invention is directed to a system and attendant structure operative to support an alternate fuel supply on a vehicle, wherein the fuel supply may be used with an improved fuel control system. The fuel control system comprises technology that allows for the safe and efficient use of a gaseous fuel such as, but not limited to, liquid natural gas (LNG), in combination with a predetermined quantity of conventional distillate fuel, such as diesel fuel. As a result, the composition of an "operative fuel mixture" used to power a vehicle engine will, dependent on the operating modes of the vehicle engine and operating characteristics of the engine during the operating modes, be either a predetermined combination of gaseous fuel and distillate fuel or substantially entirely distillate fuel, absent any contribution of gaseous fuel.

At least one preferred embodiment of the system of the present invention is directed to a mounting assembly for supporting the alternate fuel supply on the vehicle. While the mounting assembly is specifically adapted for the operable support and positioning of an auxiliary or alternate fuel supply, it is also structurally and operationally capable of mounting and/or supporting a primary fuel supply. In addition, the vehicle with which the mounting assembly of the present invention is utilized may vary significantly, but the system and structure of the present invention is primarily directed to the operation of mine haul vehicles, of the type set forth below, as well as bulldozers, and other heavy duty commercial vehicles. As such, the operation of these types of heavy duty industrial vehicles is significantly benefited or enhanced by the provision of an auxiliary, or alternate fuel supply such as, but not limited to, liquid natural gas (LNG), used in combination with an improved fuel control system and an electronic control unit incorporated therein:

CATERPILLAR Models: 797, 793, 789, 785, 777, 775, 773

KOMTASU Models: HD1500-7, HD785-7, HD605-7, HD465-7, HD405-7, HD325-7

TEREX Models: TR100, TR70, TR60, TR45, TR35

HITACHI Models: EH1700-3, EH1100-3

EUCLID Models: R260, R220, R190, R170, R150, R130B, R130M, R130, R120E, R100, R90C, R90, R85B, R85, R65C, R65

Accordingly, the mounting assembly of the present invention comprises a containment structure for the fuel supply (LNG) in the form of at least one or a plurality of at least two fuel tanks. Each of the one or more fuel tanks stores the LNG or other fuel on the interior thereof during periods of non-use or operation of the vehicle. The mounting assembly further includes a housing structured to at least partially enclose the one or more fuel tanks on the interior thereof. A base is mounted on the vehicle in supporting relation to both the housing and the containment structure or fuel tanks. Therefore, the containment structure is at least partially enclosed and accordingly protected against unintended impact or contact by other objects, vehicles, etc. in the working environment of the vehicle on which the fuel supply and containment structure are disposed.

Therefore, one feature of the system and accompanying structural features of the present invention includes the aforementioned mounting assembly structured for containment and support of the alternate fuel supply. In addition and at least partially for the reasons set forth above, another feature of the present invention comprises the establishment of a predetermined containment area defined on and considered a part of the vehicle. Moreover, the containment area is defined and structured in a location which facilitates the operative communication of the alternate fuel supply, disposed within the mounting assembly, with the remainder of the fuel control system serving to regulate the distribution of fuel to the powering engine of the vehicle. Moreover, the containment area and the operatively disposed mounting assembly are collectively positioned in laterally adjacent and exposed relation to an operator area of the mine haul vehicle. In addition, the mine haul vehicle typically includes the operator area defined by an enclosed operator cab.

The mounting assembly and the containment area are thereby cooperatively disposed and structured to facilitate storage of the alternate fuel and its operative delivery to the powering engine of the mine haul vehicle. The containment area is more specifically described as being directly adjacent to an exterior side or corresponding side wall of the enclosed operator cab. When the mounting assembly is operatively disposed in the containment area in its intended position, it is directly exposed to the operator cab. More specifically, such an "exposed" relation or position of the mounting assembly, relative to the operator cab, may be more specifically defined by the placement of the mounting assembly in a position which at least partially obstructs the normal field of vision of an operator occupying the operator cab. As a result, auxiliary viewing capabilities are also preferably mounted on the mine haul truck so as to overcome any visual restrictions of the operator due to the exposed positioning of the mounting assembly when mounted in the adjacently disposed containment area.

More specifically, additional viewing components may be utilized, such as one or more cameras or other viewing facilities. The cameras, etc. are operative to observe and transmit a display of the obstructed field of vision to a real time display located in a position to be easily viewed by the operator. The camera(s) or other appropriate viewing facilities may be considered a part of or associated with the mounting assembly or may be located independently thereof, in a location which best facilitates the observance of the area obstructed from normal viewing by the operator. An appropriate monitor or other display screen may thereby be disposed within the interior of the enclosed operator cab, or in other appropriate positions, in order to enhance the portion of the operator's field of vision which is obstructed by the exposed positioning of the mounting assembly within the containment.

Additional features of the predetermined containment area comprise a platform, cover or like support facility located immediately adjacent to and exteriorly of the operator cab. When the platform is operatively position, it may be disposed in covering, overlying relation to operative components of the mine haul vehicle yet have sufficient structural integrity and overall dimension as to adequately support a preferred mounting assembly. It is emphasized that different mounting assemblies may be utilized for support and storage of the alternate fuel supply.

Disposition of the containment area in immediate, laterally adjacent relation to the operator area or enclosed operator cab defines its placement beneath and at least partially underlying relation to a frontal portion of the dump truck body of the mine haul vehicle. Therefore, the containment area and mounting assembly are at least partially enclosed. However, while the mounting assembly is in the containment area and in the aforementioned exposed position relative to the operator cab, it is also at least partially open, as described in greater detail hereinafter. Also, this disposition of the mounting assembly within the containment area provides an effective and efficient placement on the mine haul vehicle to facilitate the operative communication of the alternate fuel with the powering engine of the vehicle, through interaction with the fuel control system, as set forth above.

These and other objects, features and advantages of the present invention will become clearer when the drawings as well as the detailed description are taken into consideration.

BRIEF DESCRIPTION OF THE DRAWINGS

For a fuller understanding of the nature of the present invention, reference should be had to the following detailed description taken in connection with the accompanying drawings in which.

Like reference numerals refer to like parts throughout the several views of the drawings.

DETAILED DESCRIPTION OF THE PREFERRED EMBODIMENT

Figure 1:
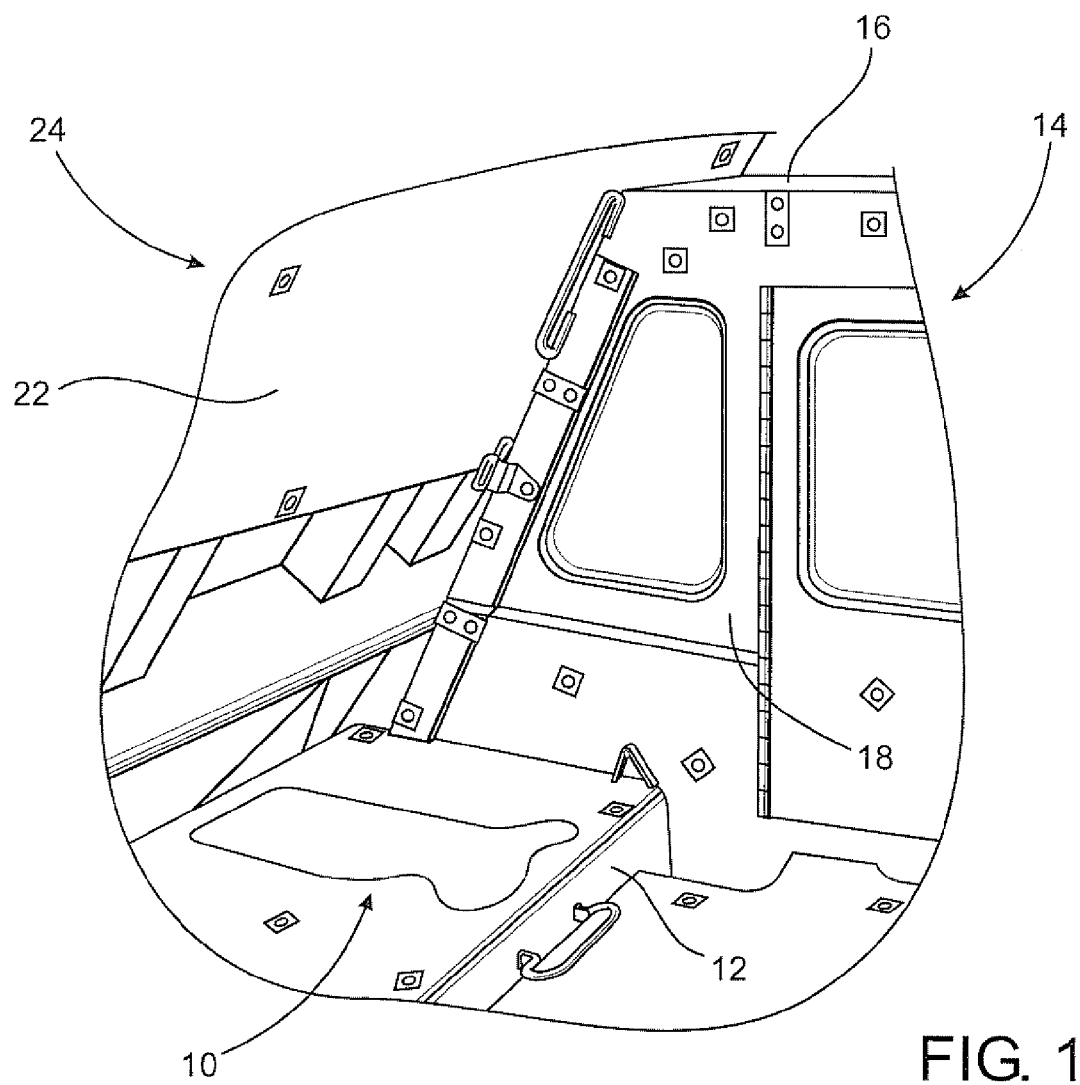
FIG. 1 is a perspective view of a containment area defining a portion of the present invention, mounted and considered a part of an industrial vehicle, specifically including a mine haul dump truck vehicle and an operator area of the vehicle.
Figure 2:
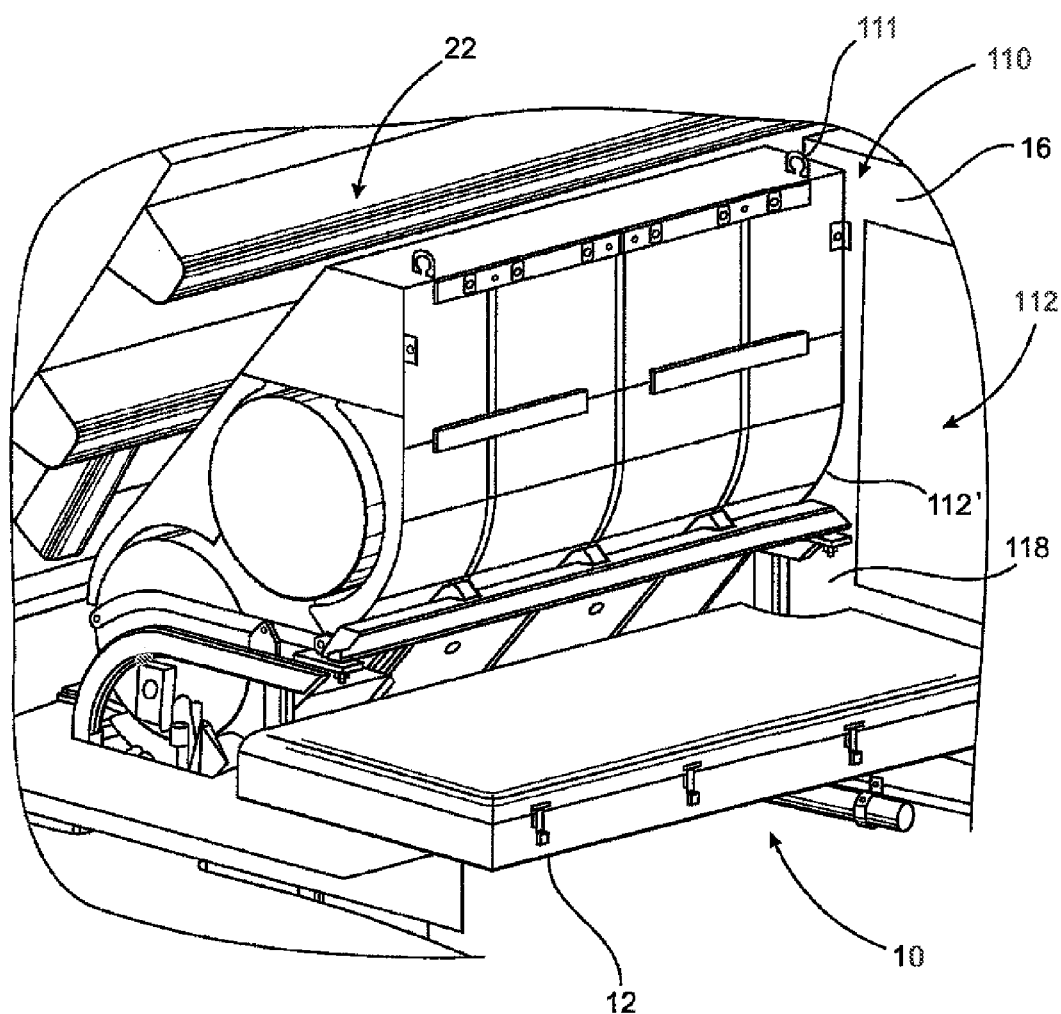
FIG. 2 is a perspective view in partial cutaway of one preferred embodiment of a mounting assembly of the present invention disposed on or within the containment area of the embodiment of FIG. 1 in a first orientation.
Figure 3:
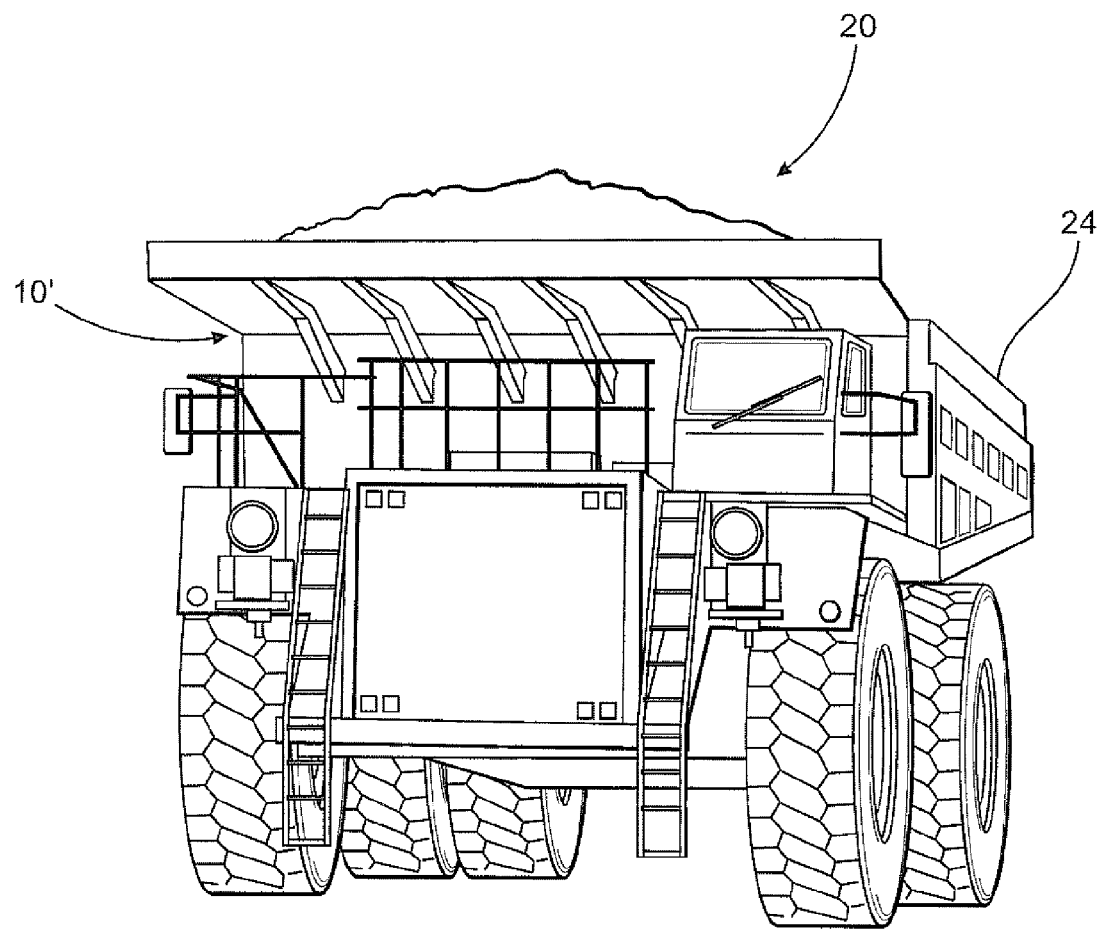
FIG. 3 is a perspective view of an industrial vehicle, specifically including a mine haul dump truck vehicle which includes the containment area of the embodiment of FIG. 1.

As represented in FIGS. 1 through 3, the present invention is directed to a system, cooperative structuring and attendant facilities for operatively disposing a mounting assembly 110 within a containment area generally indicated as 10. The containment area 10 is disposed on and is considered and integrated part of an industrial or commercial vehicle specifically including a mine haul dump truck vehicle generally indicated as 20 in FIG. 3. As such, the containment area 10 includes a platform 12 and a sufficiently dimensioned and configured area to operatively dispose at least one preferred embodiment of the mounting assembly 110 therein as generally indicated in FIG. 2 and described in greater detail in FIGS. 4 through 6.

As set forth above, the industrial or commercial vehicle 20 may be in the form of a mine haul dump truck vehicle such as, but not limited to a CATERPILLAR: model 777. However, as set forth above the versatility of the mounting assembly 110 and the dimension, configuration and overall structure of the cooperative containment area 10 allows the mounting assembly to be used on a variety of similar industrial or commercial vehicles including different makers and models of such vehicles, as indicated above. Further by way of reference and clarity, the containment area 10 is generally located on the vehicle, as at 10' and with reference to both FIGS. 1 and 3, the containment area 10, 10' is located immediately and laterally adjacent to an operator area generally indicated as 14. Moreover, typical of mine land haul vehicles 20, the operator area 14 comprises and enclosed operator cab 16 having an exterior wall or like partition member 18 disposed in at least partially confronting or immediately adjacent relation to the containment area 10 including the platform 12. As such, operative disposition of the mounting assembly 110 in the containment area 10 and on or at least directly associated with a platform 12 serves to dispose the mounting assembly 110 in immediate laterally adjacent relation to the operator area 14 and/or enclosed operator cab 16. The disposition of the containment area 10 in the laterally adjacent to the operator area 14 further serves to dispose the mounting assembly 110 in a visually obstructing or "exposed" relation relative to the interior of the operator cab 16. As a result the field of vision normally available to an operator in the operator cab 16 will be somewhat blocked of hindered due to the "exposed" laterally adjacent relation of the mounting assembly 110 through the operator area 14 and more specifically the operator cab.

Therefore, in order to enhance the obstructed field of vision of an operator within the operator cab 16, the vehicle 20 may be additionally equipped with an auxiliary viewing facility comprising at least one camera and a viewing monitor or display. The at least one camera, not shown for purposes of clarity can be located in any of a plurality of appropriate positions and orientations on the vehicle 20 so as to enhance the obstructed view of the operator created by the exposed disposition of the mounting assembly 110. Similarly, the display or monitor is located preferably on the interior of the operator cab or in another appropriate location which is clearly viewable by an operator so as to overcome the at least laterally obstructed view of the operator from the operator area 14 or enclosed cab 16.

As further represented in FIGS. 1 and 2, additional structural features define by or associated with the containment area 10 and the operatively disposed mounting assembly 110, as represented in FIG. 2, includes the mounting assembly 110 disposed in at least partially enclosed or at least minimally covered relation relative to a frontal portion 22 of the dump truck body 24. More specifically, the mounting assembly 110 is disposed at least partially beneath and in underlying relation to the overlying position of the frontal portion 22 of the dump truck body 24. With reference to FIG. 3, a frontal portion of the containment area 10 still remains at least partially open. Therefore, the placement or installation of the mounting assembly 110 within the containment area 12 may be accomplished, at least in part, by a raising or opening of the truck body 24 such that the frontal portion 22 thereof is outwardly spaced away from the containment area 12. Appropriate hooks or like connectors 111 are mounted on the housing 112 of the mounting assembly 110 to facilitate its positioning, such as by crane or other appropriate lifting device. Hoverer, as clearly represented in FIG. 2 the operative disposition of the mounting assembly 110 is located immediately and laterally adjacent to the operator area 14 including the enclosed cab 16 so as to abut or be minimally spaced away from a the lateral sidewall portion 18 as generally set forth above. Moreover, when the installation of the mounting assembly 110 is complete, the dump truck body 24 may be conventionally raised and lowered so as to assume and facilitate the normal operation of the vehicle 20.

Figure 4:
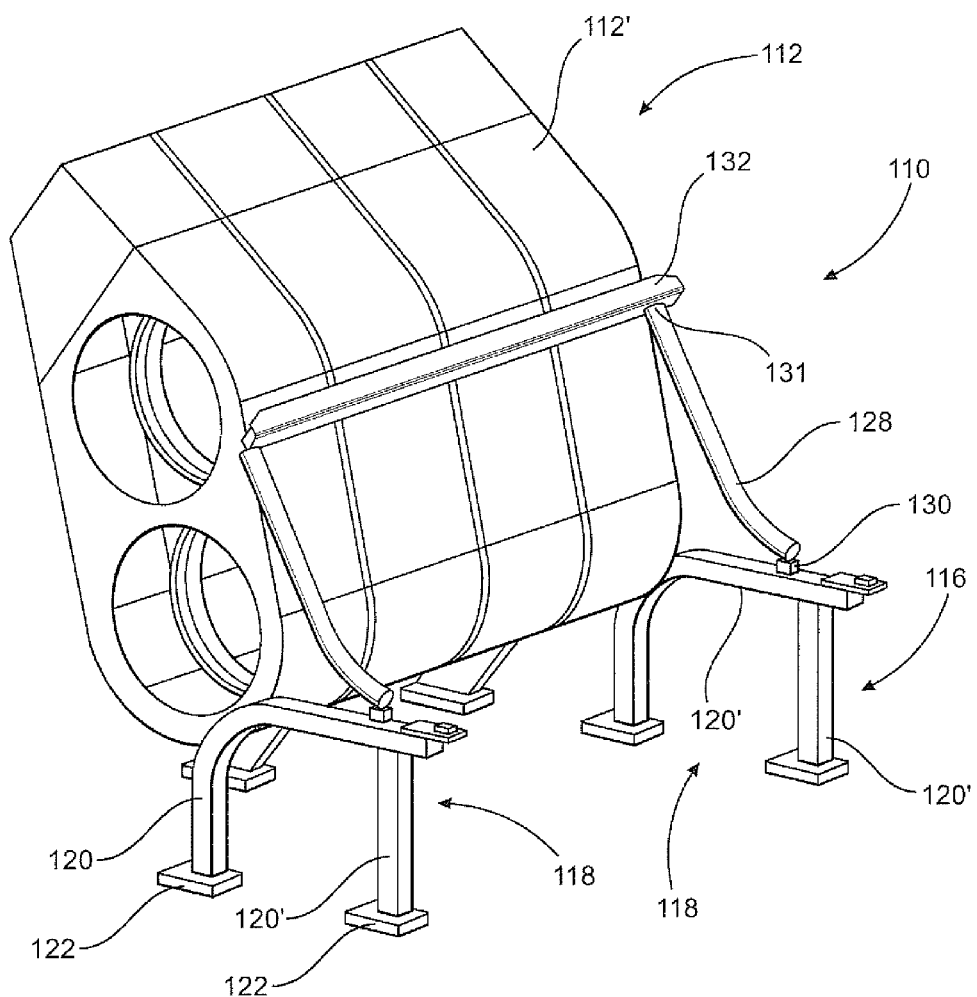
FIG. 4 is a rear perspective view in at least partially schematic form of one embodiment of a mounting assembly of the present invention, wherein the housing thereof is in a second orientation.
Figure 5:
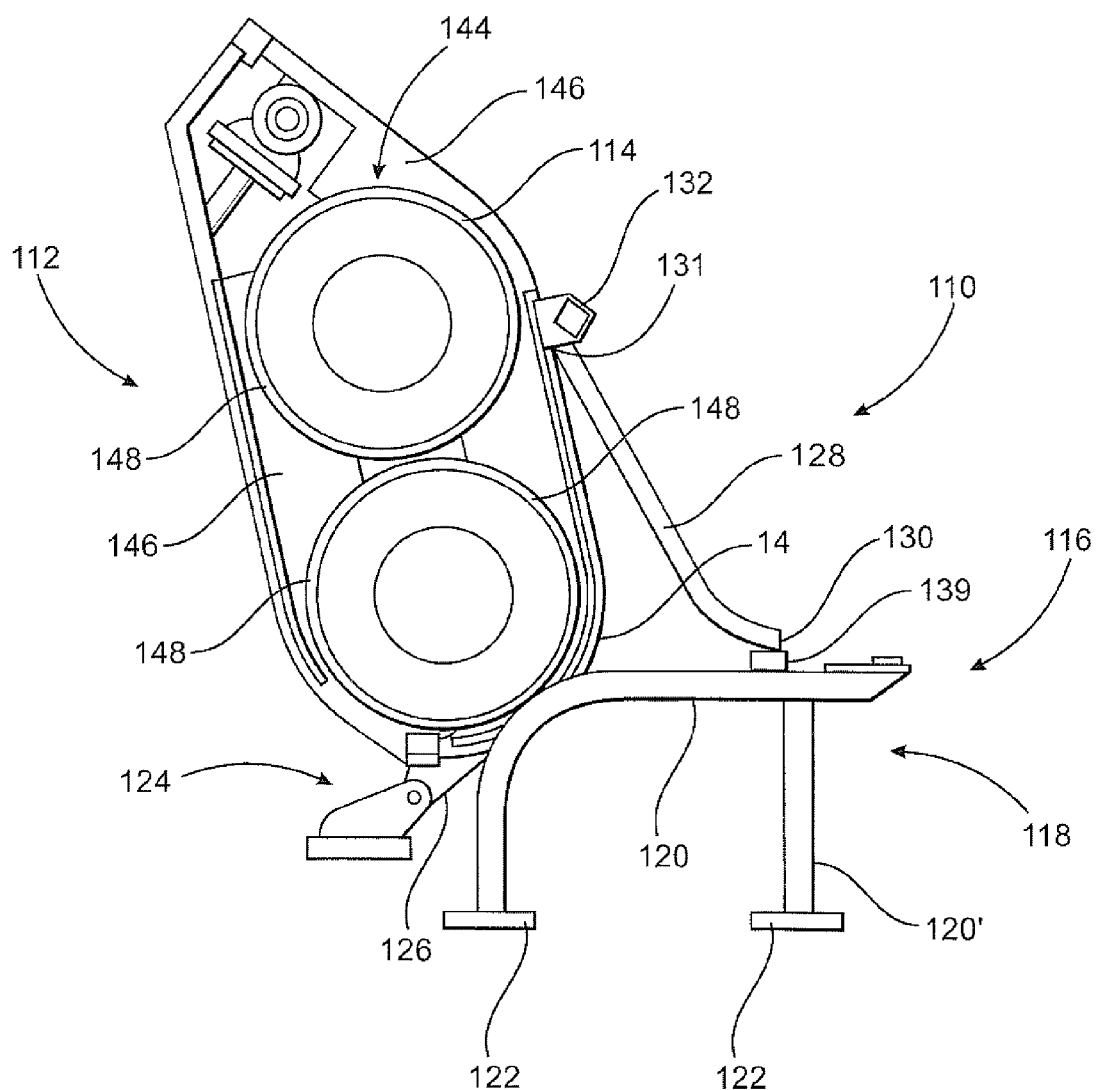
FIG. 5 is a side view of the embodiment of FIG. 4.
Figure 6:
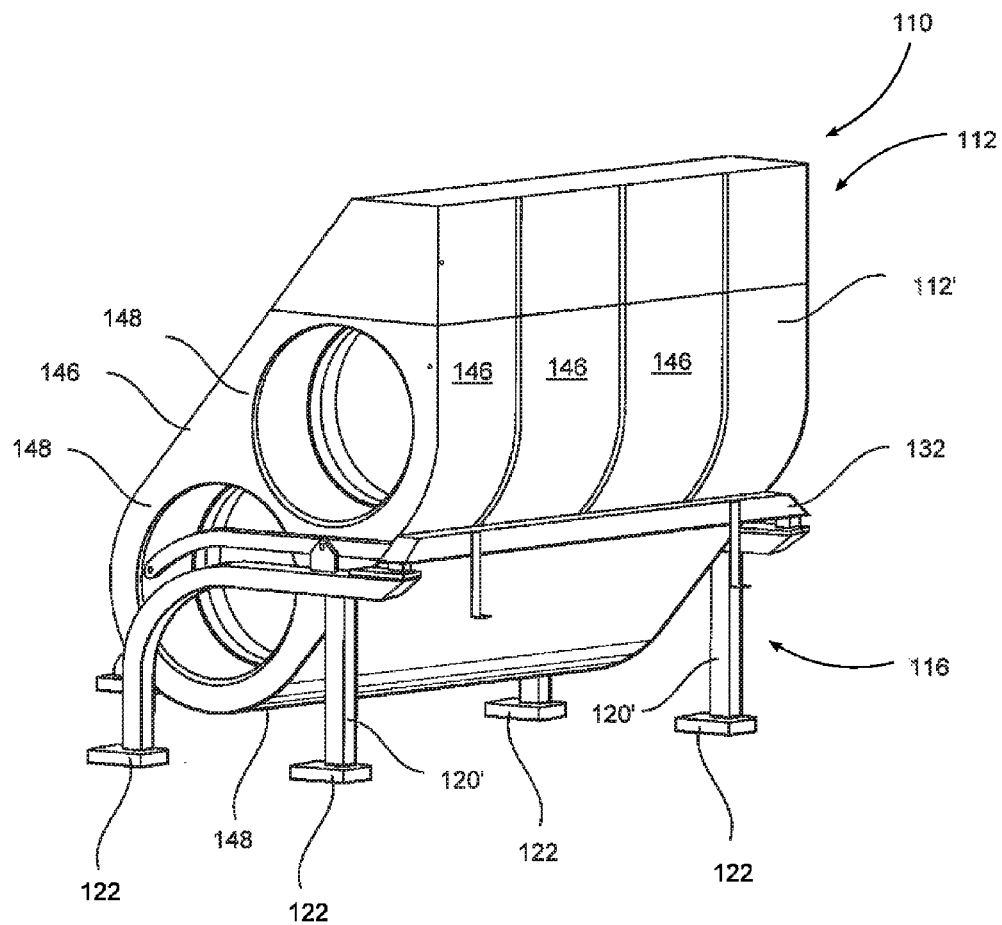
FIG. 6 is a rear perspective view in at least partially schematic form of the embodiment of FIGS. 4 and 5 of the mounting assembly, wherein the housing thereof is in the first orientation.

With primary reference to FIGS. 4-6, the present invention is directed to a mounting assembly generally indicated as 110 including a movably interconnected housing generally indicated as 112. The mounting assembly 110 is specifically, but not exclusively, intended for use on heavy duty "mine haul" vehicles, bulldozers or other vehicles of the type generally set forth above. As emphasized herein the mounting assembly is specifically dimensioned and configured to facilitate its operative placement within the containment area 10 defined on or considered a part of the mine haul dump truck vehicle.

More specific structural details of the mounting assembly 110 of the embodiment of FIGS. 2 and 4-6 include the housing 112 being structured to include the alternate fuel supply disposed within a containment area 10. The housing 112 comprises at least one but in certain practical applications, a plurality of fuel tanks 114. As also represented, the housing 112 is supported and interconnected to the vehicle 20 by means of a base assembly, generally indicated as 116. The base 116 includes a plurality of support legs 118 each of which include leg segments 120 and 120' having the lower end thereof fixedly secured, such as by welding the accompanying mounting pads 122 to the platform 12 or other appropriate portion of the containment area 10 of the vehicle 20, on which the mounting assembly 110 is disposed.

The base 116 may also include a connecting assembly comprising at least one but in certain practical applications a plurality of at least two hinge structures generally indicated as 124. Each of the hinge structures 124 are connected to an appropriate link 126 or like structure secured to an under portion of the housing 114 as clearly represented. The structural and operative features of each of the one or more hinge structures 124 is such as to facilitate the selective positioning or movement of the housing 112 as well as the containment structure or fuel tanks 114 between a first orientation, as represented in FIGS. 2 and 6, and a second substantially upright orientation, as represented in FIGS. 4 and 5. Accordingly, the connecting hinge structures 124 serve to movably interconnect the housing 112 to the containment area 10 and further serve to support the housing 112 at least when the housing is in the second orientation of FIGS. 4 and 5. The disposition of the hinge structures 124 also add to the support of the housing 112 when it is in the first orientation, as clearly represented in FIG. 6. The one or more hinge structures 124 may be considered a part of the base 116 due to their support of the housing 112 when at least in the second orientation and most probably when in both the first and second orientations. However, dependent upon the structure, configuration and dimension of the mine haul vehicle 20 and containment area 10 in which the mounting assembly 110 is disposed, the one or more hinge structures 124 may be considered independent of the base 116 by virtue of their location being not directly adjacent to or operatively associated with the base 116.

Further with regard to the selective positioning of the housing 112 in either the first or second orientations, the mounting assembly 110 further includes a retaining assembly comprising at least one, but preferably a plurality of at least two retaining arms or bars 128. The one or more retaining arms 128 serve to maintain and at least partially support the housing 112, at least when it is in the second orientation as clearly demonstrated in FIGS. 2, 4 and 5 when in their operative position. Each of the retaining arms 128 include opposite ends removably connected, as at 130, to the correspondingly disposed support leg 118. The opposite end of each of the retaining arms 128 is removably connected, as at 131, to the housing 112 and more specifically to a brace or cross brace structure 132.

Moreover, each of the retaining arms 128 is removed from the stored orientation and disposed in the supporting orientation of FIGS. 4 and 5. When in such a supporting orientation, the opposite end 130 is removably connected to the upstanding connecting flange 139, by a threaded knob or like connector. The removable but stable interconnection of the opposite ends 130 and 131 to the mounting flange 139 and the cross brace 132, respectively, will serve to assure that the retaining arms 128 are maintained in their operative, supporting, retaining position between the base 116 and the housing 112 and/or brace 132. However, the removable interconnection of each of the retaining arms 128 in their supporting, retaining position facilitates the easy disconnection of the retaining arms 128 for selective disposition in their stored orientation in order to dispose the housing 112 in the first orientation.

The stability of the containment structure, comprising the one or more fuel tanks 114 within the interior of the housing 112, is further enhanced by a stabilizing assembly 144 also at least partially disposed on the interior of the housing 112. The stabilizing assembly 144 includes at least one but preferably a plurality of stabilizing members 146 disposed in spaced relation to one another and collectively extending along the length of the one or more fuel tanks 114 defining the containment structure for the fuel supply. In addition, the stabilizing members 146 may be disposed on opposite sides of fuel tanks 114. In addition, each or at least some of the stabilizing members 146 include a recessed segment or portion 148 at least partially dimensioned and configured to the corresponding exterior configuration of each of the fuel tanks 114. As such, the plurality of stabilizing members 146 can be defined as collectively and at least partially surrounding and/or "sandwiching" the plurality of fuel tanks 114 there between. By virtue of this cooperative disposition and structure, movement or inadvertent, unintended displacement of the one or more fuel tanks 114 within the interior of the housing 112 is eliminated or significantly restricted. In addition, the stabilizing assembly 146 can be defined by a plurality of the stabilizing members 148 which may vary in number, size, configuration, etc. so as to accommodate a confronting engagement or relation with the one or more fuel tanks 114 in a manner which facilitates the ability to restrict the displacement or movement of the fuel tanks 114 within the interior of the housing 112, whether the housing 112 is in either the aforementioned first or second orientations.

Figure 7:
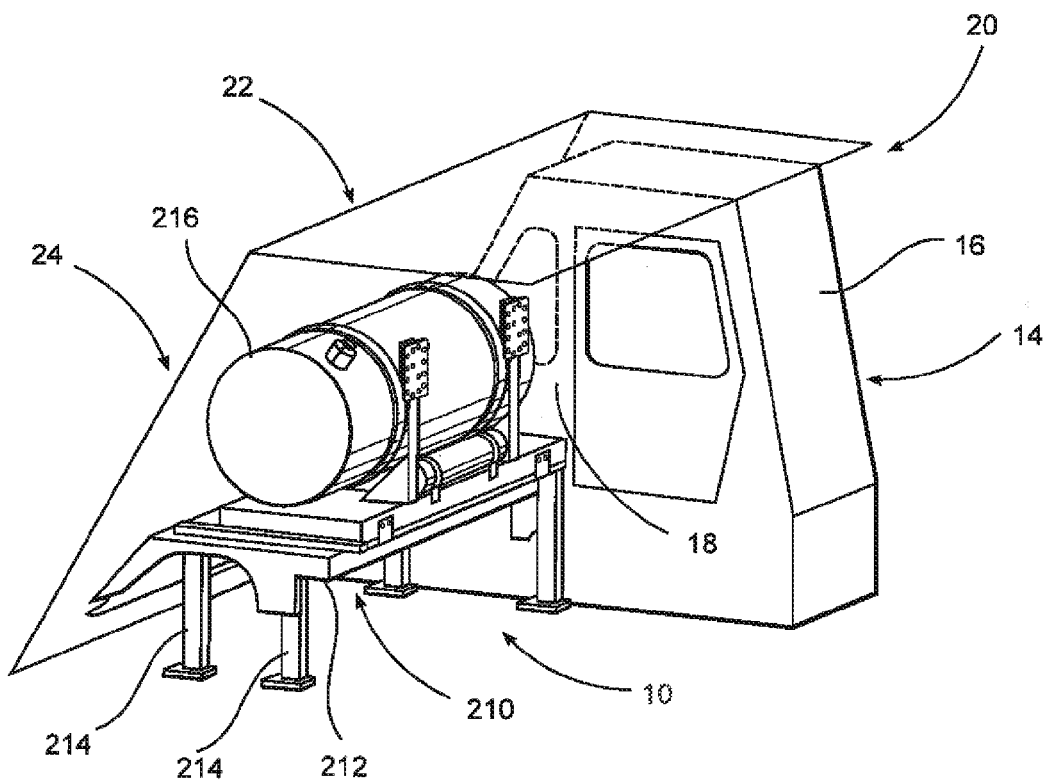
FIG. 7 is another preferred embodiment of the mounting assembly, disposed within the predetermined containment area of the mine haul vehicle.

The versatility of the containment area 10 is further represented in at least partially schematic form in the embodiment of FIG. 7. In one preferred embodiment the mounting assembly 110 of the embodiment of FIGS. 2 and 4 through 6, may be operatively disposed in the containment area 10. However, other mounting assemblies having a variety of different but appropriate structural features may be utilized with a variety of different vehicles, specifically including mine haul vehicles, as set forth in detail herein. More specifically, in the additional preferred embodiment of FIG. 7 the mounting assembly is generally indicated as 210 and includes a base 212 having a support frame or like structure comprising a plurality of legs 214. In addition, a containment structure is in the form of at least one fuel tank 26 for storage and support for the alternate and/or auxiliary fuel supply such as (LNG). As with the mounting assembly 110 the additional preferred embodiment of the mounting assembly 210 is located in the containment area 10 and in immediate, laterally adjacent relation to the operator area 14 which may be in the form of the enclosed operator cab 16. As such at least a portion of the mounting assembly 210 including, but not limited to, the containment structure or one or more fuel tanks 216 are positioned in an "exposed" or visually obstructing relation as relates to the field of vision of an operator within the operator cab 16 of the operator area 14. Accordingly, the aforementioned auxiliary viewing assembly, including at least one camera and a display or monitor, is also provided for use by an operator when the mounting assembly 210 is operatively disposed within the containment area 10.

As also set forth above, the containment area 10 and the mounting assembly 210 are disposed in underlying relation to at least a frontal portion 22 of the dump truck bed 24 so as to be partially enclosed and/or protected thereby when the dump truck bed 24 is in its closed or lowered position. However, the containment area 10 is still preferably in the frontal, at least partially open location 10' of the vehicle 20 as represented in FIG. 3.

Since many modifications, variations and changes in detail can be made to the described preferred embodiment of the invention, it is intended that all matters in the foregoing description and shown in the accompanying drawings be interpreted as illustrative and not in a limiting sense. Thus, the scope of the invention should be determined by the appended claims and their legal equivalents.

Now that the invention has been described,

What is claimed is:

1. An assembly for modifying an industrial vehicle to include an alternate fuel supply used to facilitate the powering of the vehicle, wherein the improvement comprises:
   an industrial vehicle comprising a mine haul dump truck, said industrial vehicle including a containment area and an operator area disposed on said vehicle including an operator cab having an exterior wall;
   said containment area including at least one panel overlying operative components of the industrial vehicle
   a mounting assembly mounted in said containment area, said mounting assembly including a base and a housing, said housing supported on said base;
   at least one fuel tank defining a containment structure for the alternate fuel supply, said at least one fuel tank at least partially enclosed within said housing;
   a connecting assembly movably connecting said housing to said containment area, said connecting assembly including at least one hinge structure facilitating selective disposition of at least said housing between a first orientation and a second orientation;

said mounting assembly positioned to dispose said at least one fuel tank in overhanging relation to said at least one panel when said housing is disposed in said first orientation; said second orientation at least partially defined by said housing disposed in a substantially upright orientation, relative to said first orientation.

2. An assembly as recited in claim 1 wherein said mounting assembly and said housing are disposed in supporting relation to said at least one fuel tank, at least partially on said platform; said mounting assembly further disposed in a substantially exposed relation to an interior of said operator cab.

3. An assembly as recited in claim 2 wherein said exposed relation of said mounting assembly is at least partially defined by said mounting assembly disposed in visually obstructing relation to a field of vision of an operator positioned within the operator cab.

4. An assembly as recited in claim 1 wherein said containment area is disposed in at least partially covered, underlying relation to at least a portion of a dump truck bed of said mine haul dump truck.

5. An assembly as recited in claim 1 further comprising a shield assembly integrated into said housing and disposed exteriorly of and in at least partially protective relation to said at least one fuel tank and a stabilizing assembly disposed within said housing; said stabilizing assembly comprising at least one stabilizing member including a recessed portion dimensioned and configured to at least partially conform to said at least one fuel tank.

6. An assembly as recited in claim 1 wherein said containment area and said mounting assembly are further disposed in at least partially underlying relation to at least a portion of a dump truck bed of said mine haul dump truck.

7. An assembly as recited in claim 1 further comprising a plurality of fuel tanks at least partially enclosed within said housing, said plurality of fuel tanks collectively defining said containment structure for the alternate fuel supply.

8. An assembly as recited in claim 1 wherein said industrial vehicle comprises a CATERPILLAR, model 777 mine haul dump truck.

9. An assembly as recited in claim 1 wherein said at least one hinge structure pivotally connects and at least partially supports said housing and said at least one fuel tank in said containment area.

10. An assembly as recited in claim 9 wherein said at least one hinge structure is disposed in supporting relation to said housing and said at least one fuel tank, at least when in said second orientation.

11. The assembly as recited in claim 10 wherein said second orientation further comprises said housing at least partially supported by said at least one hinge in a substantially upright orientation in at least partially non-obstructing relation to a field of vision of an operator positioned within the operator cab; said second orientation facilitating removal of the at least one fuel tank from said housing.

\* \* \* \* \*